US010363727B1

(12) United States Patent
Woods et al.

(10) Patent No.: US 10,363,727 B1
(45) Date of Patent: Jul. 30, 2019

(54) THERMALLY-BONDED MULTILAYER PADS FORMED FROM WIDE WEBS

(71) Applicants: James M. Woods, Hendersonville, NC (US); Marilyn S. Woods, Hendersonville, NC (US)

(72) Inventors: James M. Woods, Hendersonville, NC (US); Marilyn S. Woods, Hendersonville, NC (US)

( * ) Notice: Subject to any disclaimer, the term of this patent is extended or adjusted under 35 U.S.C. 154(b) by 0 days.

(21) Appl. No.: 16/053,995

(22) Filed: Aug. 3, 2018

Related U.S. Application Data

(63) Continuation-in-part of application No. 15/912,837, filed on Mar. 6, 2018, now abandoned.

(60) Provisional application No. 62/530,837, filed on Jul. 10, 2017.

(51) Int. Cl.
*B32B 3/08* (2006.01)
*B32B 37/20* (2006.01)
*B32B 37/06* (2006.01)
*B32B 38/00* (2006.01)

(52) U.S. Cl.
CPC .............. *B32B 37/20* (2013.01); *B32B 37/06* (2013.01); *B32B 38/0004* (2013.01)

(58) Field of Classification Search
CPC ................................ A47L 13/38; A47L 13/46
See application file for complete search history.

(56) References Cited

U.S. PATENT DOCUMENTS 3,940,525 A * 2/1976 Ballard .................. B32B 27/12 428/96
5,230,119 A * 7/1993 Woods .................. A45D 40/26 15/209.1
5,507,906 A * 4/1996 Woods .................. A45D 40/26 156/250
5,771,524 A * 6/1998 Woods .................. A45D 40/00 15/209.1
RE36,601 E 3/2000 Woods et al.
6,044,515 A * 4/2000 Zygmont ............... B05C 17/00 15/209.1
6,493,898 B1 * 12/2002 Woods .................. B05C 17/00 15/209.1
6,540,853 B1 * 4/2003 Suzuki .................. D21H 21/22 156/181
6,551,436 B1 * 4/2003 Flohr ............... A61F 13/15731 156/251
9,051,669 B2 * 6/2015 Woods ...................... B32B 3/08

(Continued)

*Primary Examiner* — Lee D Wilson

(74) *Attorney, Agent, or Firm* — Luedeka Neely Group, P.C.

(57) ABSTRACT

An in-line method for manufacturing a plurality of multi-layer pads, and the resultant pads. Provided are either a web of fusible base-pad-forming material and a web of fusible intermediate barrier-layer-forming material or a bottom fusible web, and a web of fusible handle-forming material. There is no need for handle-forming material to have a width less than the width of pads being manufactured; it can be challenging to maintain the lateral alignment of multiple handle-forming strips. Either one or two thermal bonding stations are employed, with particular bonding patterns, before pads are cut out. The handle has an outer periphery coextensive with the outer periphery of the base pad and handle layers. The pads have either "wings" handles, or "L"-shaped handles.

19 Claims, 14 Drawing Sheets

(56) References Cited

U.S. PATENT DOCUMENTS

| | | | | |
|---|---|---|---|---|
| 2007/0214591 | A1 * | 9/2007 | Henderson | A47L 13/16 15/209.1 |
| 2012/0021187 | A1 * | 1/2012 | Woods | B32B 3/08 428/189 |
| 2014/0259490 | A1 * | 9/2014 | Ballas | B08B 13/00 15/209.1 |
| 2015/0089760 | A1 | 4/2015 | Woods et al. | |
| 2015/0327745 | A1 * | 11/2015 | Machii | A47L 13/16 15/209.1 |
| 2016/0128541 | A1 | 5/2016 | Woods et al. | |

* cited by examiner 132
134
136
150
152
154
156
178
192, 196
192, 198
202, 208
210
212
104
110
114
4E
4F
4G
4H

THERMALLY-BONDED MULTILAYER PADS FORMED FROM WIDE WEBS

CROSS-REFERENCE TO RELATED APPLICATIONS

This is a continuation-in-part of Ser. NO. 15/912,837 filed Mar. 6, 2018. The benefit of U.S. provisional patent application Ser. No. 62/530,837, filed Jul. 10, 2017, is claimed.

BACKGROUND OF THE INVENTION

The invention relates to thermally-bonded multilayer pads. Embodiments disclosed herein are alternatives to the pads and methods disclosed in Woods et al U.S. Pat. No. 5,230,119, titled "Multilayer Laminated Pad;" Woods et al U.S. Pat. No. 5,507,906 (now U.S. Re. 36,601), titled "Method for Making Multilayer Pad;" Woods et al U.S. Pat. No. 5,771,524, titled "Disposable Pad;" Woods et al U.S. Pat. No. 6,493,898, titled "Laminated Pads and Methods of Manufacture Employing Mechanically Folded Handles;" Woods et al U.S. Pat. No. 9,051,669, titled "Multilayer Pads and Methods of Manufacturing Employing Thermal Bonding"; abandoned Woods et al U.S. patent application Ser. No. 14/509,491, filed Oct. 6, 2014, titled "Multilayer Pads and Methods of Manufacture Employing Thermal Bonding"; Woods et al U.S. patent application Ser. No. 15/000,247, filed Jan. 16, 2016 titled "Muitilayer Pads and Methods of Manufacture Employing Thermal Bonding"; Zygmont U.S. Pat. No. 6,044,515 titled "Applicator Pad with Handle; and Woods et al provisional U.S. patent application Ser. No. 61/366,984, filed Jul. 23, 2010 ; the entire disclosures of which are hereby expressly incorporated by reference.

As further background, U.S. Pat. Nos. 5,230,119, 5,507,906 and U.S. Re. 36,601generally disclose pads which have what may be referred to as "L"-shaped handles. U.S. Pat. No. 5,771,524 generally discloses pads which have handles that may be referred to as "wings".

SUMMARY OF THE INVENTION

In one aspect, an in-line method for manufacturing a plurality of multilayer pads is provided. The method includes the steps of providing a web of fusible base-pad-forming material; providing a web of fusible intermediate barrier-layer-forming material; providing a web of fusible handle-forming material; at a first bonding station, fusing a portion of the base-pad-forming material to the barrier-layer-forming material to form a base layer and intermediate layer precursor; at a second bonding station, fusing the handle-forming material to the base layer and intermediate layer precursor, while leaving at least one portion of the handle-forming material free with reference to a pad to be formed to form an uncut pad precursor web; and cutting through the pad precursor web to form a multilayer pad.

In another aspect, an in-line method for manufacturing a plurality of multilayer pads is provided. The method includes steps of providing a bottom fusible web, the bottom fusible web being either co-extruded barrier-layer material and base-pad material, or barrier-layer material coated over base-pad material; providing a web of fusible handle-forming material; at a bonding station, fusing the handle-forming material to the bottom fusible web, while leaving at least one portion of the handle-forming material free with reference to a pad to be formed to form an uncut pad precursor web; and cutting through the pad precursor web to form a multilayer pad.

In yet another aspect, a multilayer pad provided. The multilayer pad includes an absorbent base pad layer having an applying/wiping surface, an attachment surface opposite the applying/wiping surface, and an outer periphery. A barrier layer has a lower surface attached by fusing to the base pad layer attachment surface, an upper surface and an outer periphery coextensive with the outer periphery of the base pad layer. A handle includes attached portion fused to a portion of the barrier layer upper surface, and at least one graspable free portion joined to the handle attached portion. The handle has an outer periphery coextensive with the outer periphery of the base pad and handle layers. The handle attached portion is attached to the barrier layer upper surface along at least one bond line parallel to the pad axis.

BRIEF DESCRIPTION OF THE DRAWINGS

FIG. 5A more particularly is a plan view showing barrier-layer material and base-pad material thermally bonded together to form a base layer and intermediate layer precursor prior to a pad being cut out;

FIG. 5B more particularly is a plan view of embossed handle-forming material;

FIG. 5C more particularly is a plan view of the embossed handle-forming material thermally bonded to the base layer and intemediate layer precursor priorto a pad being cut out, with a circular dash line representing future cut lines and representing pad precursors, and a solid lines representing thermal bonding lines;

FIG. 5D more par particularly is a plan view of a pad after being cut out, with the "L"-shaped handle tilted upward;

FIG. 5E more particularly is a side elevational view taken on line 5E-5E of FIG. 5A;

FIG. 5F more particular is a side elevational view taken on line 5F-5F of FIG. 5B;

FIG. 5G more particularly is a side elevation view taken on line 5G-5G of FIG. 5C;

FIG. 5H more particularly is a side elevational view taken on line 5H-5H of FIG. 5D, showing an individual pad nearly in its in use configuration.;

DETAILED DESCRIPTION

Figure 1:
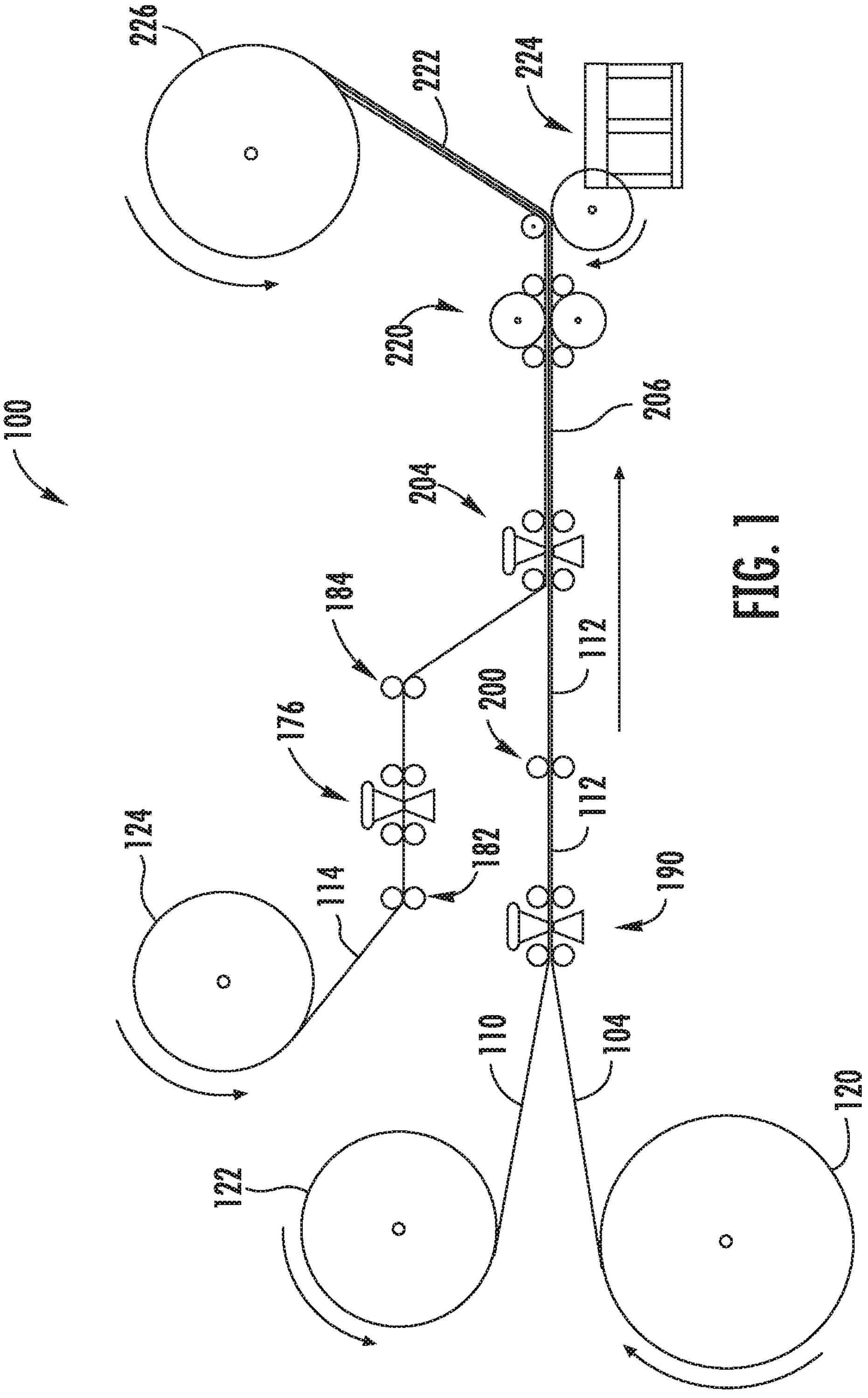
FIG. 1 is a schematic representation of a machine for the in-line automatic arumanufacture of three-layer pads, which have either what may be referred to as "wings" handles or what may be referred to as "L"-shaped handles, the machine of FIG .1 including ultrasonic bonding equipment and ultrasonic embossing tooling.

The pads and methods disclosed herein in particular are alternatives to the pads and methods disclosed in the aboveincorporated Woods et, al U.S. Pat. No. 9,051,669, titled "Multilayer Pads and Methods of Manufacturing Employing Thermal Bonding." Embodiments of the subject invention however eliminate the need for handle-forming material to have a width less than the width of pads being manufactured; it can be challenging to maintain the lateral alignment of multiple handle-forming strips. In addition, embodiments of the invention eliminate the need for any folding tooling and associated costs, particularly to form the handle.

In overview, thermal bonding, thermal fusion or heat fusion is employed in embodiments of the invention to bond one or two layers of impervious film to a layer of non-woven base pad forming material, without the use of an adhesive of any kind. A cutter, such as a die cutter, is employed to cut through the layers to form individual pads. An embosser may be employed to emboss film used for the handle, making the handle easier to see, as well as providing a better grip.

The presently-preferred thermal bonding, thermal fusion or heat fusion process is ultrasonic bonding (also known as ultrasonic laminating or ultrasonic welding). Accordingly, the embodiments of the invention described hereinbelow employ ultrasonic bonding or welding, by way of example and not limitation. When ultrasonic welding or bonding is employed. vibratory energy is converted to heat, which softens and may even melt the materials. In ultrasonic bonding, a sonotrode is a tool that creates ultrasonic vibrations and applies this vibrational energy to a material. Thus, ultrasonic bonding or welding (also known as ultrasonic laminating or ultrasonic welding) is a joining technique that uses high-frequency ultrasonic acoustic vibrations to effect solid state welding of materials that have either the same or different melting point temperatures. An ultrasonic bond is as strong as the bonded materials themselves.

Other potential sources of heat for thermal bonding include hot irons, hot air or other gas, a source of infrared energy, or other electromagnetic energy source such as a laser, all by way of example and not limitation. Fundamentally, any technique which provides localized heat in predetermined patterns for bonding, welding or fusion may be employed.

In addition to thermal bonding, thermal processes may be employed in the die cutter, as well as in the embosser. Thus individual pads may be cut out using, as examples, ultrasonic tooling or a laser. Thermal or heat-producing equipment may be employed to emboss film used for the handle.

Ultrasonic equipment may be tooled for a variety of specific operations, including in-line welding, embossing, slitting and sealing, either in single modules or arranged in an array across a web.

Suitable ultrasonic bonding or welding equipment (i.e., ultrasonic tooling) is available, as an example, from Dukane Corporation, 2900 Dukane Drive, St. Charles, Ill. 60174 (www.dukane.com/us/). Another source is Herrmann Ultrasonics Inc., 1261 Hardt Circle, Bartlett, Ill. 60103 (www.herrmannultrasonics.com). Information regarding ultrasonic bonding or welding is available from TWI Ltd, Grants Park, Great Abington, Cambridge CB21 6 AL, United Kingdom (www.twi-global.com). In addition, information regarding ultrasonic welding is available from Plastemart, Mumbai, India (www.plastemart.com).

Illustrated herein are examples of two- and three-layer multilayer pads manufactued employing ultrasonic bonding or welding. Various standard ultrasonic tooling is readily available and may be employed in the embossing and welding of a variety of materials employed in the manufacture of multilayer pads.

Figure 2:
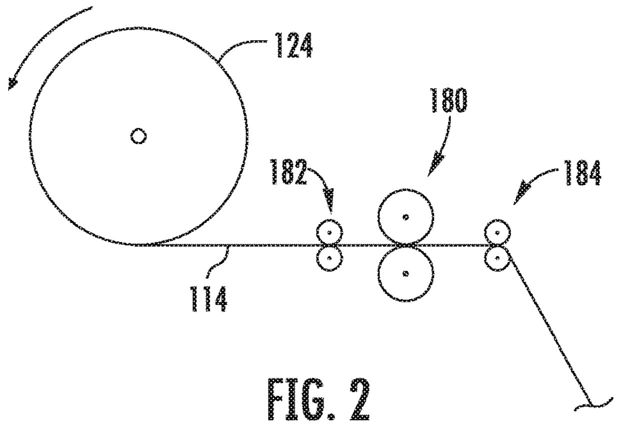
FIG. 2 is a schematic representation of alternative rotary embossing tooling, which mechanically embosses, as an alternative to the ultrasonic embossing tooling of FIG. 1.

Referring now to FIG. 1, a machine 100 for the in-line automatic manufacture of three-layer pads employing ultrasonic embossing and bonding equipment is illustrated in schematic representation. The machine 100 of FIG. 1 may be employed either to make pads having "wings" handles as generally disclosed in Woods et al U.S. Pat. No. 5,771,524, or to make pads having "L"-shaped handles as generally disclosed in Woods et al U.S. Pat. No. 5,230,119 and U.S. Re. 36,601. FIG. 2 represents rotary embossing tooling, as an alternative to the ultrasonic embosing tooling of FIG. 1.

Figure 3:
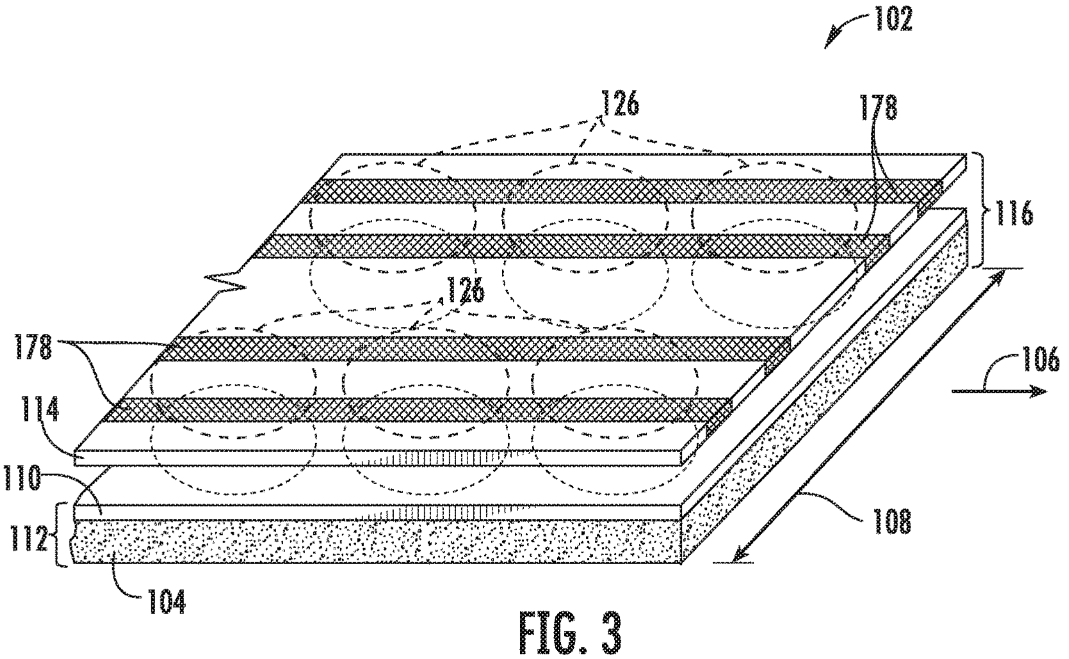
FIG. 3 is a three-dimensional view of a web of handle-forming material, and an already-fused base layer and intermediate layer precursor web adjacent each other as processed in the machine of FIG. 1, in a conditionprior to fusing of the handle-forming material.

FIG. 3 is a three-dimensional representation of three webs of material as processed in the machine 100 of FIG. 1, the three webs together forming what is referred to herein as a three-layer web 102. At the bottom in the orientation of FIG. 3 is a web 104 of fusible base-pad-forming material having a longitudinal axis represented by directional arrow 106 and a width 108. The web of base-pad-forming material in FIG. 3 is fused to a web 110 of fusible intermediate barrier-layer-forming material, forming a base layer and intermediate layerlayea precursor 112. The base layer and intermediate layer precursor 112 has a longitudinal axis also represented by the directional arrow 106. At the top in the orientation of FIG. 3 is a web 114 of fusible handle-forming material having a longitudinal axis also represented by the directional arrow 106. Significantly, and in contrast to the disclosure of Woods et al U.S. Pat. No. 9,051,669, the width of o the webs 104, 110, and 114 is not particularly important. In particular, the web 114 of fusible handle-forming material is not split into strips of sub-webs.

Although FIG. 3 shows the three-layer web 102 as having the web of base-pad-forming material 104 fused to the web 110 of fusible intermediate barrier-layer-forming material to form a representative combined web 116, reference number 102 is more generally employed herein to mean a threelayer web 102 however the three layers are joined, including a three-layer web 102 in which the layers are not joined at all.

Figures 4, 4A, 4B, 4C, 4D, 4E, 4F, 4G, 4H:
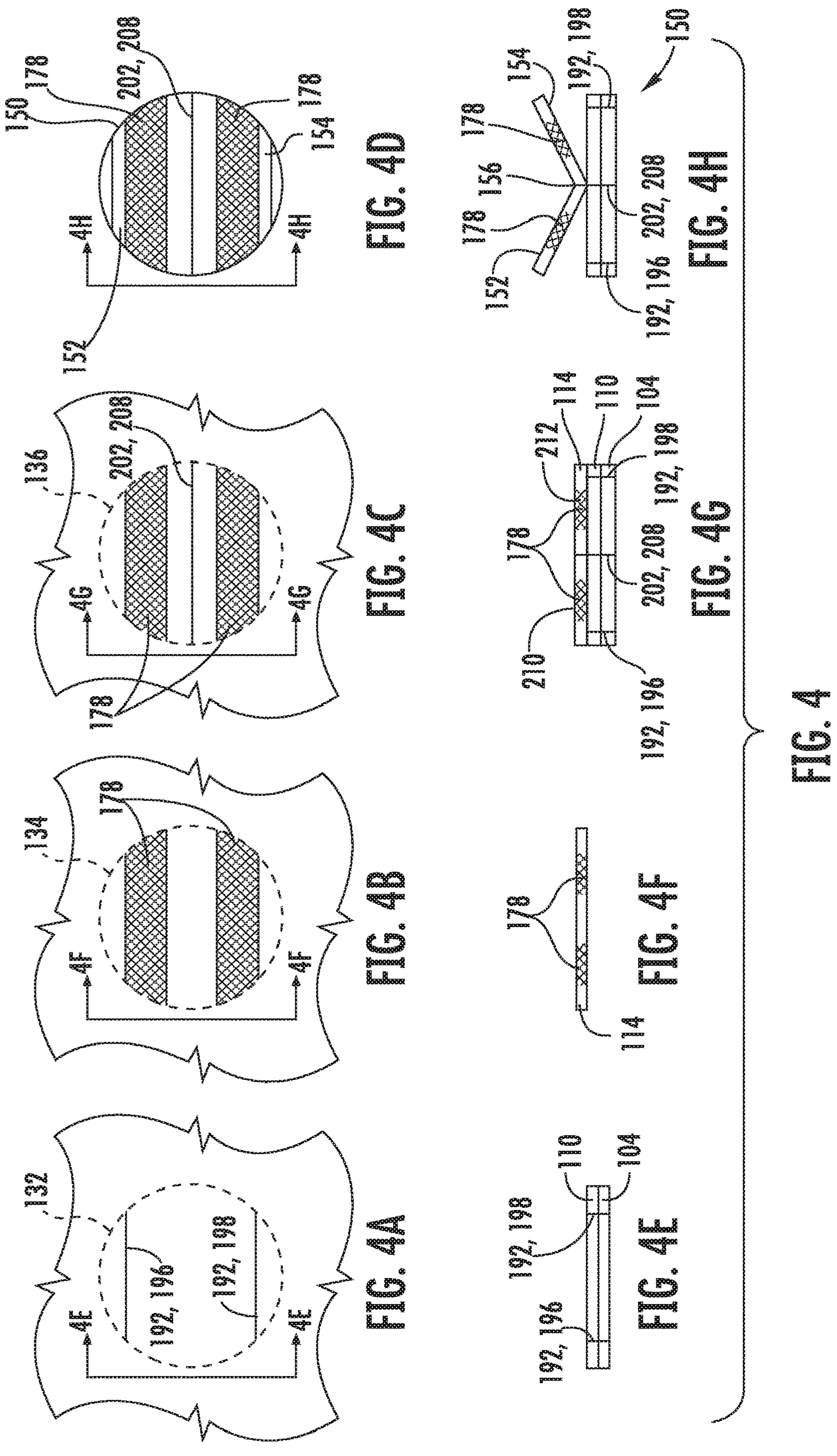
FIG. 4 is a highly schematic representation of in-line steps to manufacture pads with "wings" handles employing the machine of FIG. 1, illustrating pad precursors and pads at various stages of manufacture, with a circular dash line representing future cut lines and representing pad precursors, and solid lines representing thermal bonding lines.
FIG. 4A more particularly is a plan view showing barrier-layer material and base-pad material thermally bonded together to form a base layer and intermediate layer precursor prior to a pad being cut out.
FIG. 4B more particularly is a plan view of embossed handle-forming material.
FIG. 4C more particularly is a plan view of the embossed handle-forming material thermally bonded to the base layer and intermediate layer precursor prior to a pad being cut out, with a circular dash line representing future cut lines and representing pad precursors, and solid lines representing thermal bonding lines.
FIG. 4D more particularly is a plan view of a pad after being cut out, with both wings of the handle tilted upward.
FIG. 4E more particularly is a side elevational view taken on line 4E-4E of FIG. 4A.
FIG. 4F more particularly is a side elevational view taken on line 4F-4F of FIG. 4B.
FIG. 4G more particularly is a side elevational view taken on line 4G-4G of FIG. 4C.
FIG. 4H more particularly is a side elevational view taken on line 4H-4H of FIG. 4D, showing an individual pad in its in use configuration.
Figure 5:
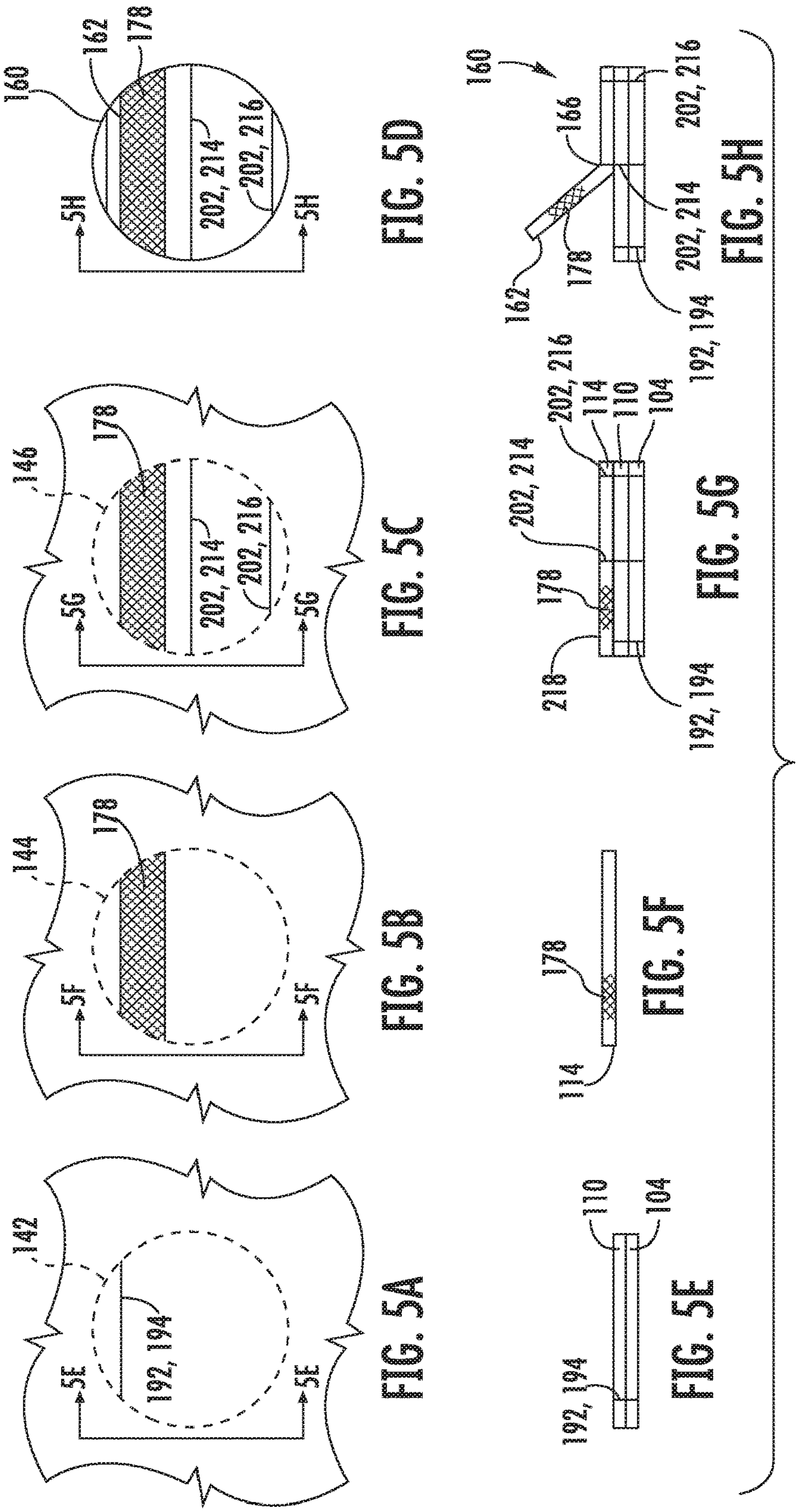
FIG. 5 is a highly schematic representation of in line steps to manufacture pads with "L"-shaped handles employing the machine of FIG. 1, illustrating pad recursors and pads at various stages of manufacture, again with a circular dash line representing future cut lines and representing pad precursors, and a single solid line representing thermal bonding lines.

FIG. 4 is a corresponding highly schematic representation of in-line steps to manufacture pads with "wings" handles employing the machine of FIG. 1. FIG. 5 is a corresponding highly schematic representation of in-line steps to manufacture pads with "L"-shaped handles also employing the machine of FIG. 1.

The machine 100 of FIG. 1 more particularly includes a feed roll 120 feeding or supplying the web 104 of fusible base-pad-forming material, a feed roll 122 supplying the web 110 of fusible intermediate barrier-layer-forming material having a longitudinal axis and a width, and a feed roll 124 suppling the web 114 of fusible handle-forming material. To facilitate thermal fusion, the material webs 104, 110 and 114 are of thermoplastic materials such as polypropylene, In one embodiment, the web 104 of base pad forming material is an absorbent material, made of non-woven fibers such as polypropylene or polyester. A blend of fibers for the base pad 104 material may also be employed, for example including cotton (which, by itself is non-fusible), but with a sufficient percentage of fusible fibers in the blend so that the resultant base pad material web 104 is fusible.

The machine of FIG. 1 may be employed to manufacture pads in a single line as implied by FIGS. 4 and 5. However, in practical commercial embodiments, pads are manufactured in-line in multiple longitudinal lines defining rows with multiple pad precursors. The rows extend perpendicularly to the longitudinal axis represented by the arrow 106. Although two rows of pad precursors 126 are shown in FIG. 3, more rows are processed in a typical commercial embodiment. Examples are disclosed in U.S. Pat. No. Re. 36,601; U.S. Pat. No. 5,771,524 and U.S. Pat. No. 6,493,898. Pad spacing may be adjusted longitudinally and laterally to reduce the amount of scrap (which is recyclable). Accordingly, it will be appreciated that the single line of pads in FIGS. 4 and 5 is to illustrate the principles of the invention.

In FIGS. 4 and 5, pad precursors or precursor regions and 132, 134, and (FIG. 4) and 142, 144, 146 (FIG. 5) represent stages or steps of pad manufacture by the machine 100 of FIG. 1. It will be appreciated that the actual steps or stages represented by the pad precursors 132, 134, 136, 142, 144 and 136 are spaced out along the length of the FIG. 1 machine 100, and are not actually immediately adjacent.

FIG. 4, in particular FIG. 4D, also shows a finished. "wings" handle pad 150 in plan view, which has been cut out from the representative combined web 116. The pad 150 as manufactured has a pair of embossed handle graspable portions 152 and 154 which are folded down as manufactured. FIG. 4H is an end elevational view of the pad 150 in its in-use configuration, with the handle graspable portions 152 and 154 pivoted up along a fold line 156.

FIG. 5, in particular FIG. 5D, similarly shows a finished "L"-shaped handle pad 160 in plan view, which has been cut out of a combined web, like the combined web 116 of FIG. 3, except the embossing is only on one side. The pad 160 as manufactured hag a single embossed handle graspable portion 162 which is folded down as manufactured. FIG. 5H is an end elevational view of the pad 160 nearly in its in-use configuration, with handle grasable portion 162 partly pivoted up along a fold line 166. (In its actual in-use configuration, the handle graspable portion 62 partly pivoted up to approximately a 90° angle along the fold line 166.)

Considering the manufacturing method disclosed in FIGS. 1, 3, 4, and 5 in greater detail, in FIG. 1, ultrasonic embossing tooling 176 optionally embosses the handle forming material 114, providing texture to facilitate grasping the resultant pad handles 152 and 154 (FIG. 4) or 162 (FIG. 5). Texture embossing 178 is represented by hatching. The embossing 178 is represented as longitudinally continuous in one or more lines along the web 114. However, the embossing 178 may actually be in discontinuous sections corresponding to pad precursors.

The lateral positioning of the embossing 178 with reference to the pad precursor regions 132, 134, 136 (FIG. 4) and 142, 144, 146 (FIG. 5), while important, is not critical. When pads are subsequently cut out there is clearance on both sides, and thus some tolerance. The positioning of the embossing 178 does not affect thermal bonding.

FIG. 2 illustrates, in highly schematic form, alternative rotary embossing tooling 180. The alternative rotary embossing tooling 180 mechanically embosses, as an alternative to the ultrasonic embossing tooling 176 of FIG. 1.

In either event, conveying rollers 182 and 184 are provided upstream of and downstream of the optimal embossing tooling 176 or 180.

At a first thermal bonding station 190 (FIG. 1), a portion 192 of the barrier-layer-forming material 110 is thermally bonded (fused) to the base-pad-forming material 104 to form the base layer and intermediate layer precursor 112. The thermal bonding may be along a single pad-attachment bond line 194 as in FIGS. 5A and 5E, if pads having "L"-shaped handles are being manufactured; or along two pad-attachment bond lines 196 and 198 as in FIGS. 4A and 4E, if pads with "wings" handles are being manufactured. In either event, the pad-attachment bond lines 194, 196 and 198 are formed near lateral edges of the pad precursors 132, 134, and 136 (FIGS. 4) and 142, 144,, 146 (FIG. 5).

Although the pad attachment bond lines 194 or 196 and 198 are shown as solid lines, such is for purposes of illustration only. Various interrupted bond line patterns may be employed, resembling stitching, or even a series of points. It is important that a bending pattern be selected which is sufficient for structural integrity but which, at the same time, does not result in pads which are unduly stiff.

Also, the pad attachment bond lines 194 or 196 and 198 may generally coincide with the pad precursors 132, 134, and 136 (FIGS. 4) and 142, 144, 146 (FIG. 5), or the pad attachment bond lines 194 or 196 and 198 may be continuous, since the pad locations, are later defined by a cutting out step, described hereinbelow.

Downstream of the first bonding station 190, the base layer and intermediate layer precursor 112 is conveyed by a pair of rollers 200.

Next, a portion 202 of the handle forming material 114, which may or may not be embossed, is thermally bonded to the base layer and intermediate layer precursor 112, at a second thermal bonding station 204. In particular, at the second bonding station 204 the handle-forming material is 114 fused to the base layer and intermediate layer precursor 112, while leaving at least one portion of the handle-forming material free with reference to a pad to be formed to form an uncut pad precursor web 206. If pads with "wings" handles (FIG. 4) are being manufactured, there is a single centrally-located bond line 208, and two portions 210 and 212 (FIG. 4G) of the handie-forming material remain free. If pads with "L"-shaped handles (FIG. 5) are being manufactured, there are at least two bond lines 214 and 216, a centrally-located bond line, bond line 214, and e.g. bond line 216 near a lateral edge. A single portion 218 FIG. 5G) of the handle-forming material remains free.

Pads are now ready to be cut out.

At a die cutting static 220 rotary die cutting tooling for example cuts through all three layers of material, creating and freeing multilayer pads 150 (FIG. 4 or 160 (FIG. 5), while leaving a scrap web 222, which typically is recyclable. As mentioned hereinabove, alternative cutting methods may be employed. By way of example and not limitation, individual pads may be cut out using ultrasonic tooling or a laser. Pads 150 (FIG. 4) or 160 (FIG. 5) are removed by vacuum from a rotary die cutter and stacked, ready for packaging. In any event, finished pads 150 or 160 are collected and packaged, for example by vacuum roll collection and stacking machinery 224 (which also pacages). Packaging options range from removing stacked pads by hand and placing the Pads in a package, to fully automated machine. Scrap remains, in particular the scrap web 222, which is collected by a scrap rewind roll 226. The scrap web material 222 includes remnants of all three layers, with multiple apertures where pads have been cut out. As one example, a die cutter and collection mechanism is disclosed in greater detail the above-incorporated Woods et al U.S. Pat. No. 6,493,898. It will be appreciated that, after cutting, there are various ways to handle the pads. One example is a simple "knock out," where, after cutting, pads are literally "knocked out" from web into a collection tray or onto a moving conveyor belt. "Knock out" is not an ideal method; pads need to be hand counted and then loaded by hand.

Figure 6:
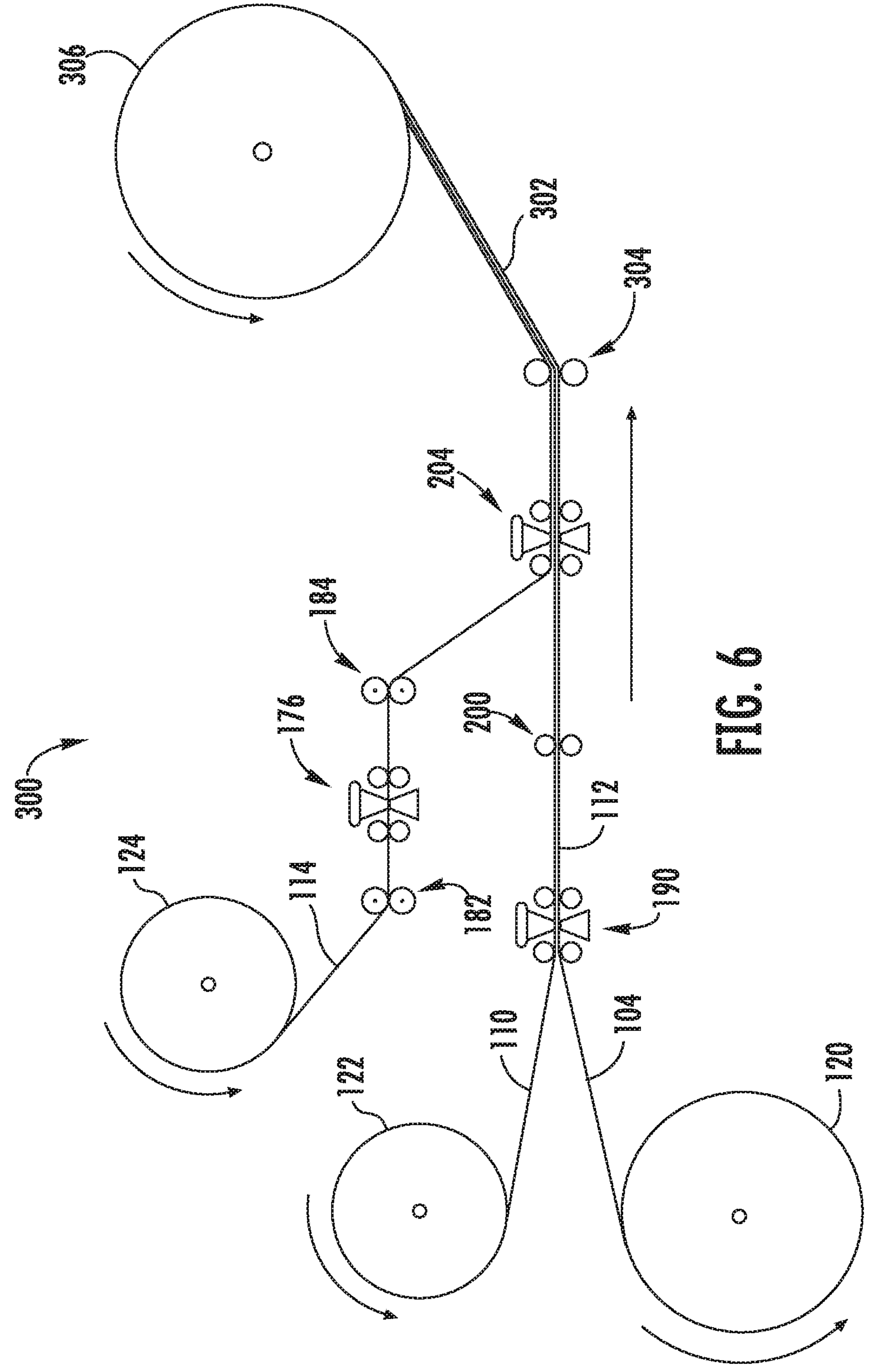
FIG. 6 is a schematic representation of a machine in which embossed handle-forming material, barrier-layer material, and base-pad material thermally bonded together and rewound, ready for further processing, in particular, cutting.

With reference now to FIG. 6, illustrated is another machine 300 embodying the invention, which machine 300 employs a "make up" procedure The machine 300 of FIG. 6 is like the machine 100 of FIG. 1, except the die cutting station 220 of FIG. 1 is eliminated, as well, as the FIG. 1 vacuum roll collection and stacking machinery 224 and scrap rewind roll 226. Instead, following the second bonding station 204, a web 302 of embossed handle-forming material 114, barrier layer material 110 and base material 104 is thermally bonded and wound onto a temporary storage roll 304, guided by a pair of rollers 306, but not cut. In other words, the cutting out of pads is deferred.

The resultant web 302 on the temporary storage roll 306 can be warehoused, ready for cutting and packaging. This web 302 may be created on separate equipment or on production machinery, should there be actual production down timer.

Other elements in the machine 300 of FIG. 6 may be the same as corresponding elements in the machine 100 of FIG. 1. These corresponding elements accordingly in general are not further described with reference to FIG. 6, but have the same reference numbers in FIG. 1.

Figure 7:
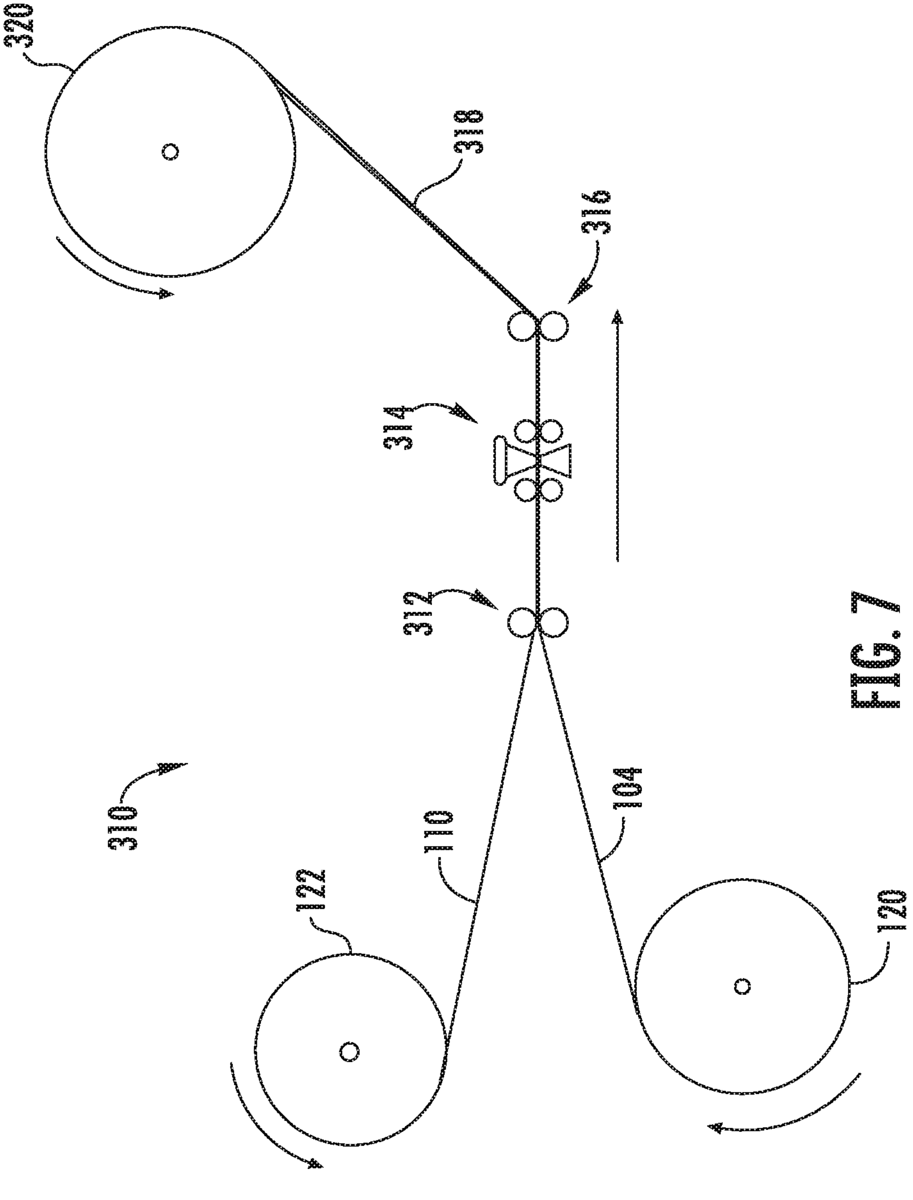
FIG. 7 is a schematic representation barrier-forming material thermally bonded to base pad material and rewound, ready for thermal bonding of handle forming material.

With reference now to FIG. 7, represented is another machine 310 embodying the invention, which machine 310 employs another "make up" procedure. The machine 310 of FIG. 7, like the machine 100 of FIG. 1, includes the feed roll 120 feeding or supplying the web 104 of fusible base-pad-forming material, and the feed roll 122 supplying the web 110 of fusible intermediate barrier-layer-forming material. Following the feed rolls 120 and 122 is a pair 312 of guide rollers, in turn followed by a first thermal bonding station 314 which is like the first thermal bonding station 190 described hereinabove with, reference to FIG. 1. In FIG, 7, following the first thermal bonding station 314 is another pair 316 of guide rollers. At that point, barrier-layer-forming material has been thermally bonded to base pad material, forming a web 318 ready for thermal bonding of handle-forming terial.

A temporary storage roll 320 stores the web 318. The web 318 of FIG. 7 on the temporarystorage roll 320 be warehoused, ready for thermal bonding of handle-forming material, cutting and packaging. The web 318 may be created on separate equipment or on production m achinery, as needed.

Figure 8:
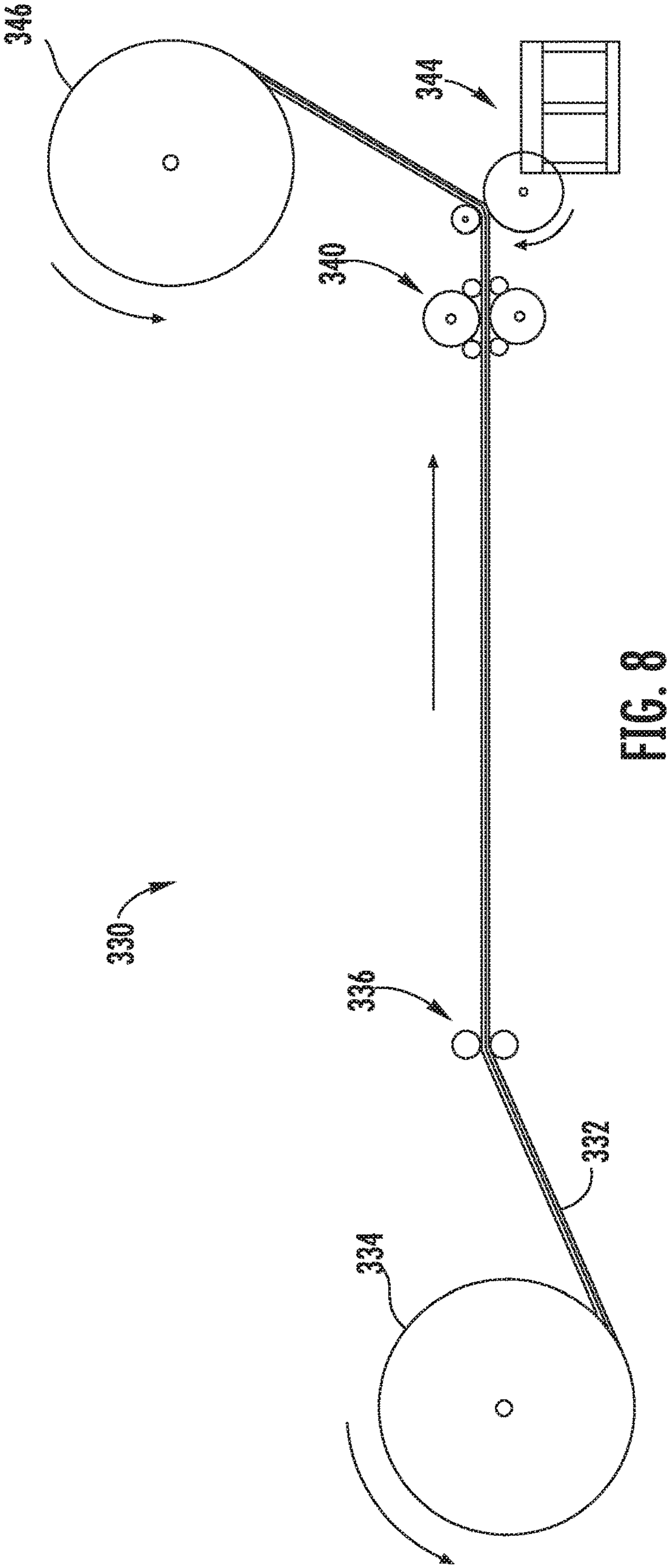
FIG. 8 is a schematic representation of pre-rolled handle-forming materia barrier-layer material and base pad material, being thermally-bonded, die cut, and packaged.

With reference now to FIG. 8, represesented is another machine 330 embodying the invention. In the machine 330 of FIG. 8, the 104 of fusible base-pad-forming material and the web 110 of fusible intermediate barrier-layer-forming material have been thermally bonded at a first bonding station (like the first bonding station of FIG. 1, but not shown in FIG. 8) forming the base layer and intermediate layer precursor 112, combined with the web 114 of fusible handle-forming material to form a three-layer prepared web 332, and wound onto a temporary storage roll 334. The prepared web 332 is unwound from the temporarystorage roll 334 corresponding to the temporary storage roll 306 of FIG. 6, and passes between a pair 336 of guide rollers.

At a die cutting cutting station 340 rotary die cutting tooling cuts through all three layers of material, creating and freeing multilayer pads 150 or160. Finished pads 150 or 160 are collected and packaged, for example by vacuum roll collection and stacking machinery 344. Scrap is collected by a scrap rewind roll 346.

Figure 9:
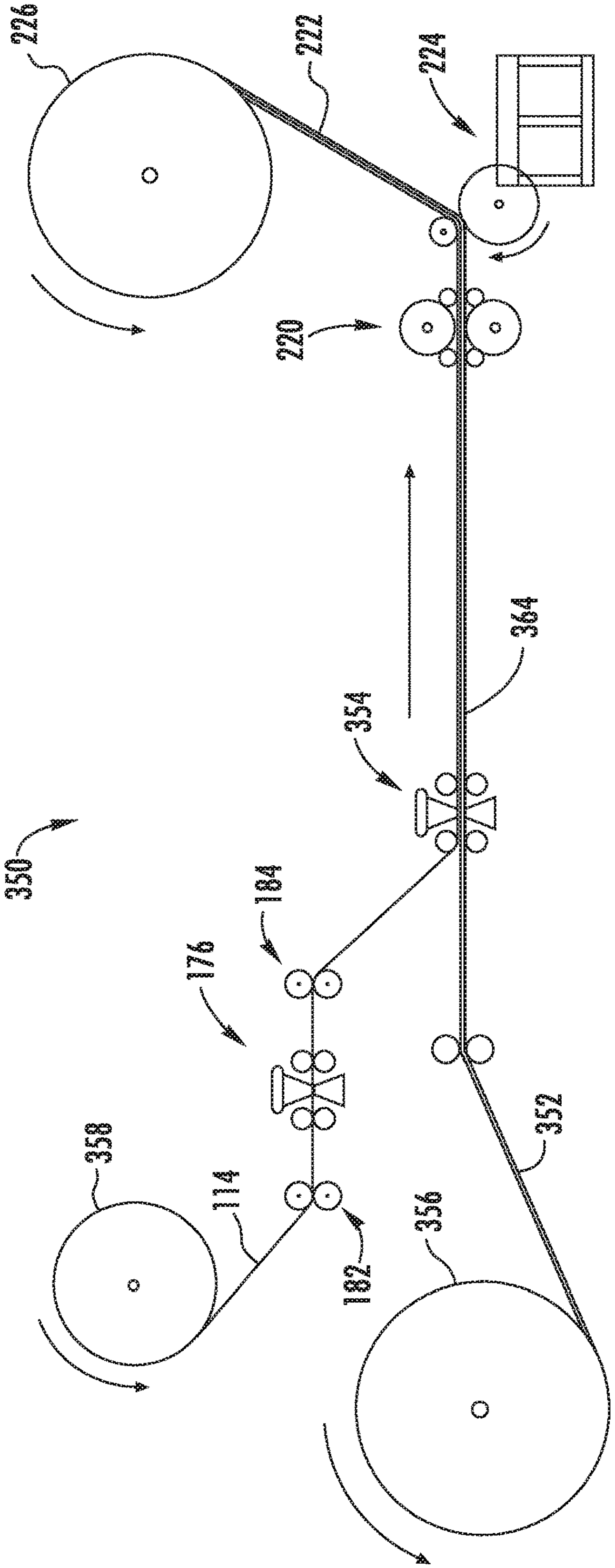
FIG. 9 a schematic representation of embossed handle-forming material thermally bonded either to a previously thermally bonded and re-wound barrier to base material ("Wings" or "L"-shaped handles), or to an embossed andu film thermally bonded to a roll of coated ("Wings" or "L"-handles), cut and packaged.

With reference now to FIG. 9, represented is et another machine 350 embodying the mention. Either pads with "wings" handles or pads with "L"-shaped handles may be. In the machine of FIG. 9, thereis a bottom fusible web 352 which is either co-extruded barrier-layer material and base pad material, or barrier-layer material coated over base-pad material; barrier-layer material thermally bonded to base pad material. Such a bottom fusible web 352, for example, may be formed by hot extrusion of material forming an impervious barrier layer over a layer of base-pad-forming material.

In the machine 350 of FIG. 9, there is only a single thermal bonding station 354.

In the machine of FIG. 9, a feed roll 356 stores and subsequently supplies the bottom fusible web 352, while a feed roll 358 supplies the web 114 of fusible handle forming material. As in FIG1 1, in the machine 350 of FIG. 9 embossing tooling 176, shown by way of example as ultrasonic embossing tooling, optionally embosses the handle foaming material 114, providing texture to facilitate grasping the resultant pad handles 152 and 154 (FIG. 4) or (FIG. 5). Conveying rollers 182 and 184 are provided upstream of and downstream of the optional embossing tooling 176 (FIG. 1) or 180 (FIG. 2).

Alternatively, instead of the bottom fusible web 352, the base layer and intermediate layer precursor 112 of FIG. 1, may be wound on the feed roll 356. In that case, the first thermal bonding station is employed in the making of the base layer and intermediate layer precursor 112, and the single thermal bonding station 354 corresponds to the second bonding station 204 of FIG. 1

In any event, the handle forming material 114, which may or may not be embossed, is then thermally bonded to the bottom fusible web 352 at the thermal bonding station 354. In particular, and as in the embodiment of FIG. 1, in FIG , at the bonding station 354, the handle-forming material is 114 fused to bottom fusible web 352, while leaving at least one portion of the handle-forming material free with reference to a pad to be formed to form an uncut pad precursor web 364. As described hereinabove, if pads with "wings" handles (FIG. 4) are being manufactured, there is a single centrally-located bond line 208, and two portions 210 and 212 of the handle-forming material remain free. If pads with "L"-shaped handles (FIG. 5) are being manufactured, there are at least two bond lines 214 and 216, a centrally-located bond line, e.g. bond line 215, and e.g, bond line 216 near a lateral edge. A single portion 218 of the handle-forming material remains free.

The die cutting station 220, the vacuum roll collection and stacking machinery 224, and the scrap rewind roll 226 of FIG. 9 are as described hereinabove with reference to FIG. 1.

Figure 10:
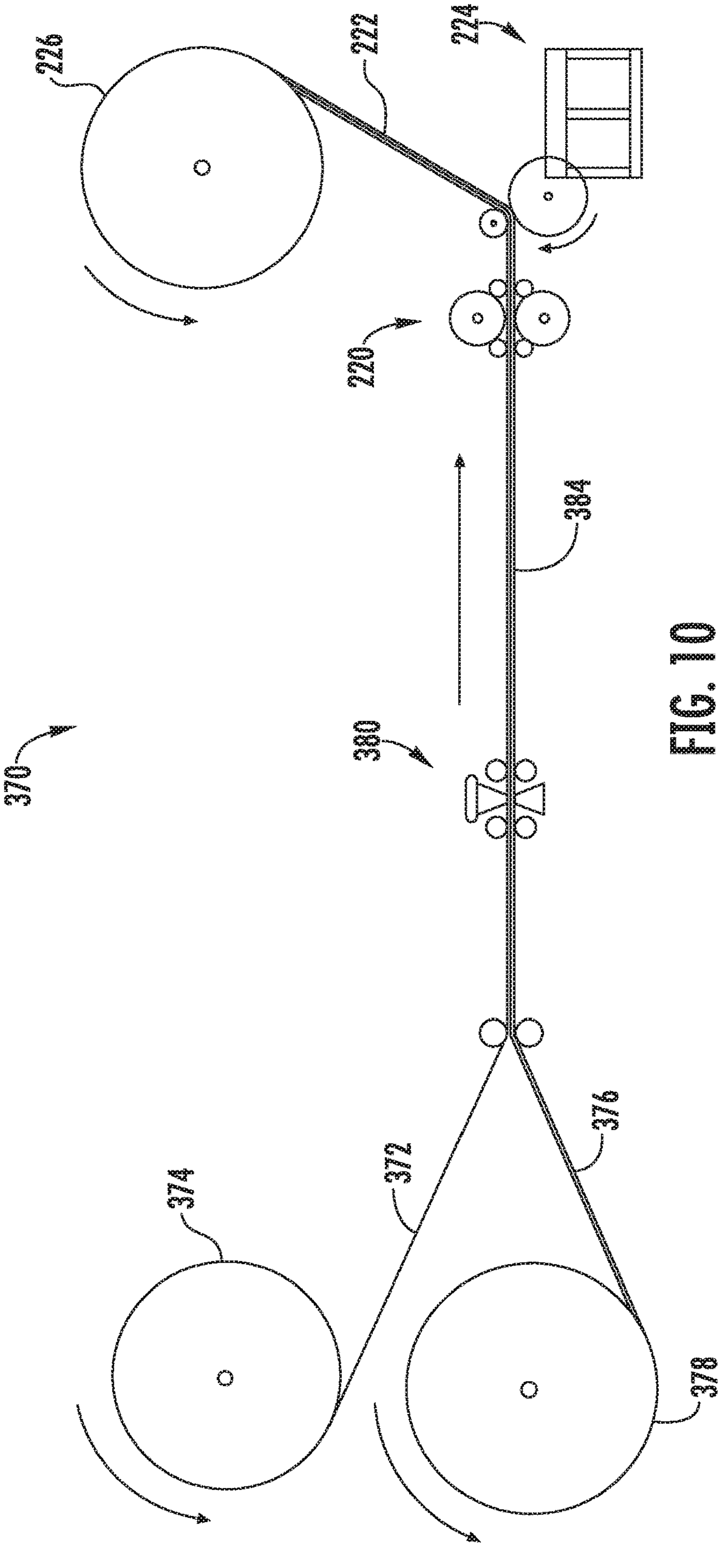
FIG. 10 s a similar schematic representation of pre-rolled handle-forming material and either co-extruded barrierlayer material and base pad material, or barrier-layer material coated over base-pad material, being thermally-bonded, die cut, and packaged.

With reference now to FIG. 10, represented is a similar machine 370 embodying the invention The machine 370 of FIG. 10 differs from the machine 350 FIG. 9 in that, in the machine 370 of FIG. 10 handle material 372 has been pre-embossed and re-rolled on a feed roll 374. Either pads with "wings" handles or pads with "L"-shaped handles may be made. In the machine 370 of FIG. 10, again there is a bottom fusible web 376 which is either co-extruded barrier-layer material and base-pad material, or barrier-layer material coated over base-pad material. Such a bottom fusible web 376, for example, may be formed by hot extrusion of material forming an impervious barrier layer over a layer of base-pad-forming material. A temporary storage feed roll 378 stores and subsequently supplies the bottom fusible web 376.

Again, in the machine 370 of FIG. 10, there is only a single bonding station 380.

Alternatively instead of the bottom fusible web 352, the base layer and intermeddate layer precursor 112 of FIG. 1, may be wound on the feed roll 378. In that case, the first bonding station is employed in the making of the base layer and intermeddiate layer precursor 112, and the single bonding station 380 corresponds to the second bonding station 204 of FIG. 1.

In any event the pre-embossed handle forming material 372 then thermally bonded to the bottom fusible web 76 at the bonding station 380. In particular, and as in the embodiment of FIG. 10, in FIG. 10, at the bonding station 330, the handle-forming material is 372 fused to bottom fusible web 376, while leaving at least one portion of the handle-forming material free with reference to a pad to be formed to form an uncut pad precursor web 384. As described hereinabove, If pads with "wings" handles (FIG. 4) are being manufactured, there is a single centrally-located bond line 208, and two portions 210 and 212 of the handle-forming material remain free. If pads with "L"-shaped handles (FIG. 5) are being manufactured, there are at least two bond lines 214 and 216, a centrally-located bond line, e.g. bond line 215, and e.g. bond line 216 near a lateral edge. A single portion 218 of the handle-forming material remains free.

The die cutting station 220, the vacuum roll collection and stacking machinery 224, and the scrap rewind roll 226 of FIG. 9 are as described hereinabove with reference to FIG. 1.

Figure 11:
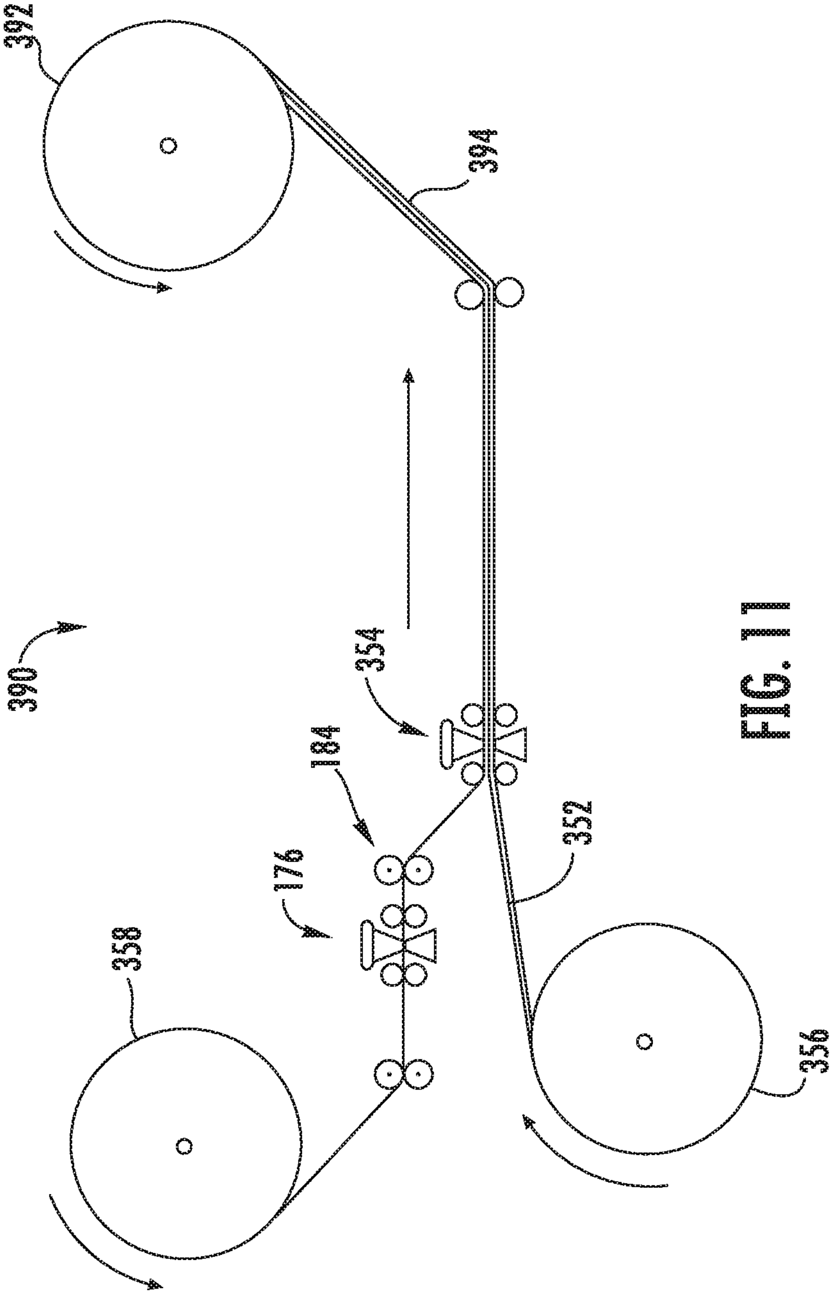
FIG. 11 is a schematic representation of embossed handle-forming material and either co-extruded barrier-layer material and base pad material, or barrier-layer material coated over base-pad material, ultrasonically bonded together and rewound, ready for further processing, in particular, cutting.

With reference now to FIG. 11, represented is a yet another machine 390 embodying the invention. The machine 390 of FIG. 11 differs from the machine 350 FIG. 9 in that, like in the machine 300 of FIG. 6, a "make up " procedure is employed. Thus there is a temporary storage roll 392 on which a bonded but uncut web 394 is made up and wound. The web 394 includes embossed handle-forming material 114. The web 394 further includes either co-extruded barrier-layer material and base pad material, or barrier-layer material, coated over base-pad material, ultrasonically bonded together and rewound.

The other elements of the machine 390 of FIG. 11 are similar to those of the machine 350 FIG. 9. Identical reference numbers are employed to denote corresponding elements. Corresponding elements are, described hereinabove, and are not further described with reference to FIG. 11.

Figure 12:
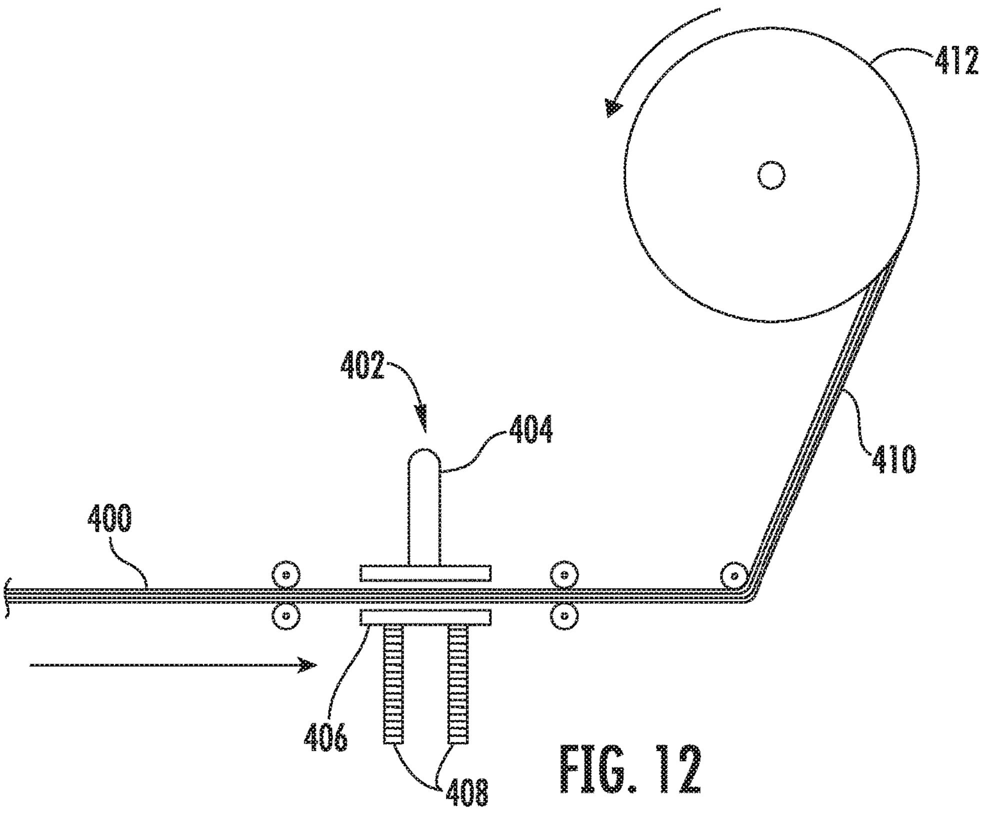
FIG. 12 schematic representation illustrating in-line plate cutting as an alternative to die cutting.

With reference to FIG. 12, represented in highly-schematic form is in-line platen cutting as an alternative to die cutting. FIG. 12 shows a method, by which the pads are cut then stacked into collection tubes. From there pads may be either removed by hand; for packaging, or machinery may remove and package pad automatically. Alternately, each platen die tool may have a "knock out" tool enclosed within its cavity, after which strike pads are forced downdownward and into a pre-packaging tube or tubes. More specifically, the embodiment of FIG. 12, a combined web 400 is fed to a cutting station 402. The combined web 400 may be either a three-layer web like the web 116 of FIG. 3 (as illustrated in FIG. 12).The combined web 400 may be supplied either by a bonding station as in the machine 100 of FIG. 1 or as in the machine 350 of FIG. 9, or by a temporary storage roll like the temporary storage roll 320 of FIG. 7 or the temporary storage roll 392 of FIG. 11. The cutting station 402 includes a platen die 404 and an opposing strike plate 406. Pads are removed into pad collection tubes 408. A scrap web 410 is wound onto a scrap collection roll 412.

Figure 13:
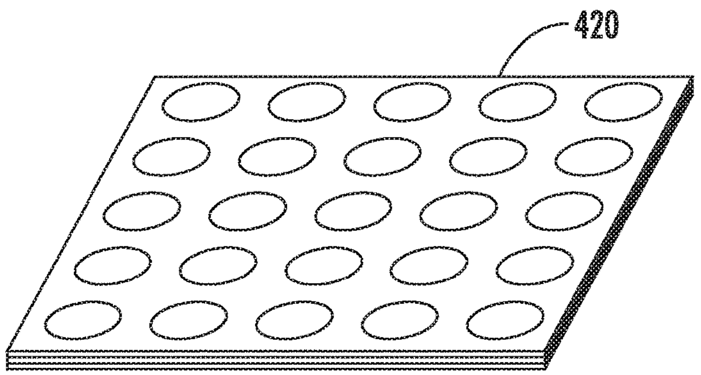
FIG. 13 illustrates scrap after pads have been cut out and removed.

FIG. 13 illustrates scrap 420, after pads have been cut out and removed, either "knocked out,"or by the cutting station 402 of FIG. 12.

Figure 14:
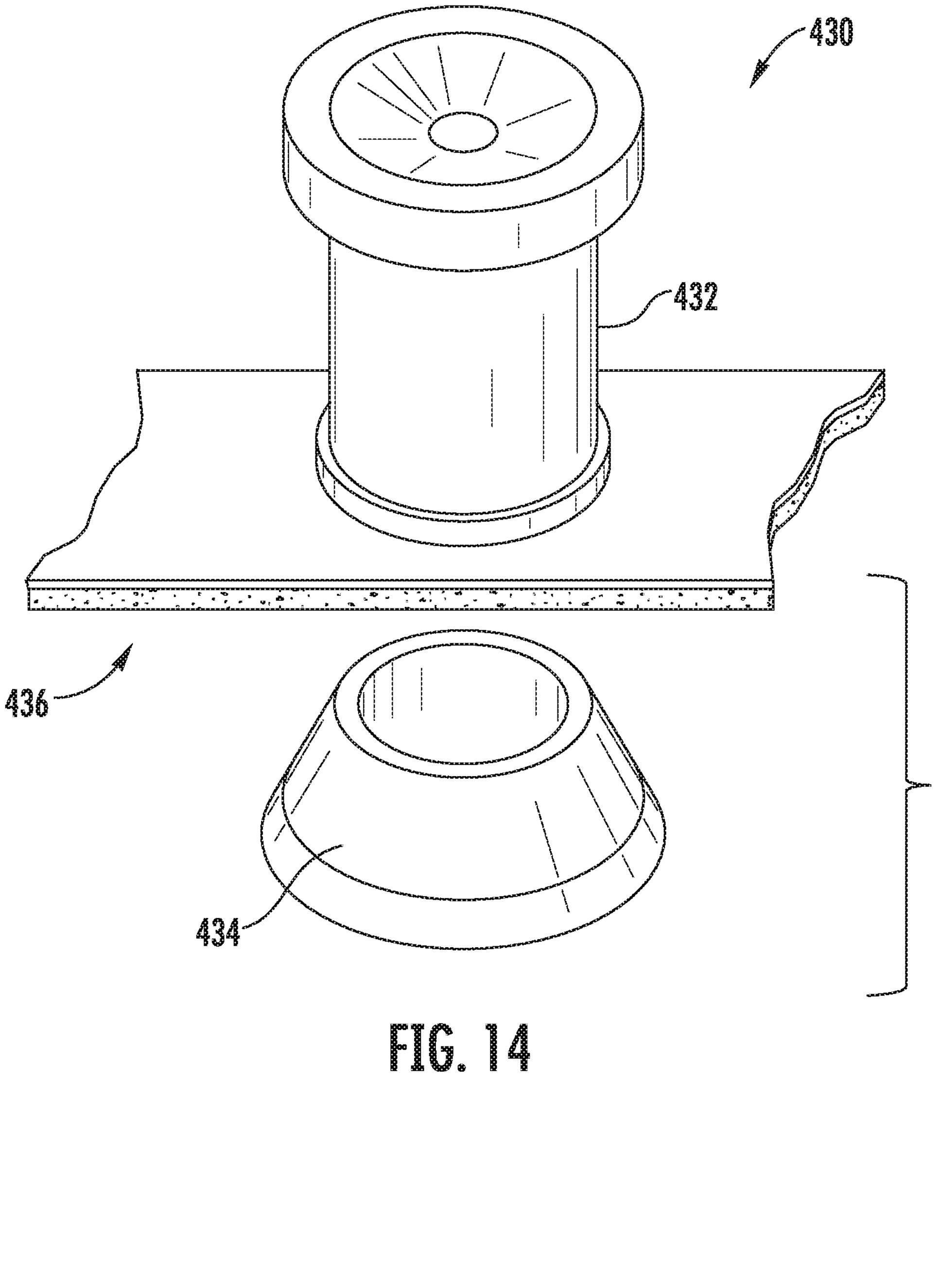
FIG. 14 illustrates tooling which effects plunge cutting and sealing in a single stroke.
Figure 15:
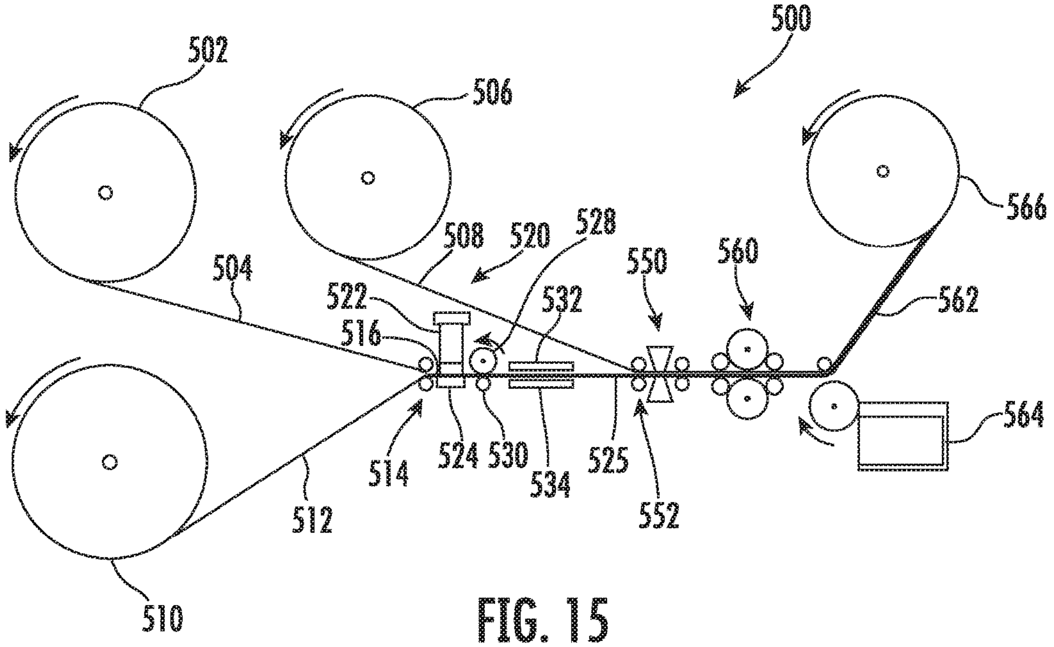
FIG. 15 is a schematic representation of a machine for the in-line automatic manufacture of three-layer pads, which have either what may be referred to as "wings" handles or what may be referred to as "L"-shaped handles, the machine of FIG. 19 effecting plunge cutting and sealing in a single stroke.

FIG. 14 illustrates tooling 430 which, effects plunge cutting and, sealing in a single stroke. Such single-stroke cutting and sealing is used for example to cut and seal foam base powder or other cosmetics applicators ypically found in women 's powder compacts (not shown in FIGS. 14-18). The embodiment of FIG. 14 may be set up singly or in an array. The tooling 430 of FIG. 14 includes an ultrasonic plunge cut tool 432 and an opposing strike 434. The tooling FIG. 14 is shown cutting through a web 436 of base pad and barrier layer material. An important benefit of ultrasonic plunge cut and seal tooling is that the sonotrode and oposing anvil remain relatively cool.

Referring finally to FIGS. 15-20, FIG. 15 illustrates a machine 500 which effects plunge cutting and sealing in a single stroke, for example to cut and seal foam base powder or other cosmetics applicators typically found in women's powder compacts. The machine 500 of FIG. 1 includes three feed rolls, a feed roll 502 for a web 504 of barrier layer material, a feed roll 502 for a web 504 of handle-forming material, and a feed roll 510 for a web 512 of base layer material.

The webs 504 and 512 of barrier layer material and of base layer material are guided and brought together by a pair 514 of rollers, to form a combined base and intermediate layer web 516. The combined base and intermediate layer web 516 is then supplied to a plunge cut and seal thermal bonding station 520 which includes a tool 522 and an opposing tool 524. The plunge cut and seal thermal bonding station 520 is like the plunge cut tooling 430 of FIG. 14.

Figure 16:
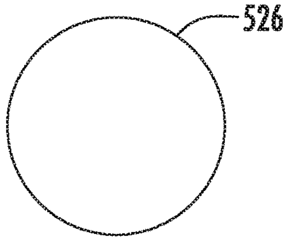
FIG. 16 represents a pad precursor resulting from plunge cutting and thermal bonding sealing.

FIG. 16 illustrates a pad precursor 526 resulting from plunge cutting and thermal bonding sealing.

Following the plunge cut and seal thermal bonding station 520 are a pad feed roller 528 and and opposing pad feed roller 530, followed next by a pad guide plate 532 above and a pad support plate 534 below. The combined base and intermediate layer web following the plunge cut and seal thermal bonding station 520 is designated 525.

Figure 17:
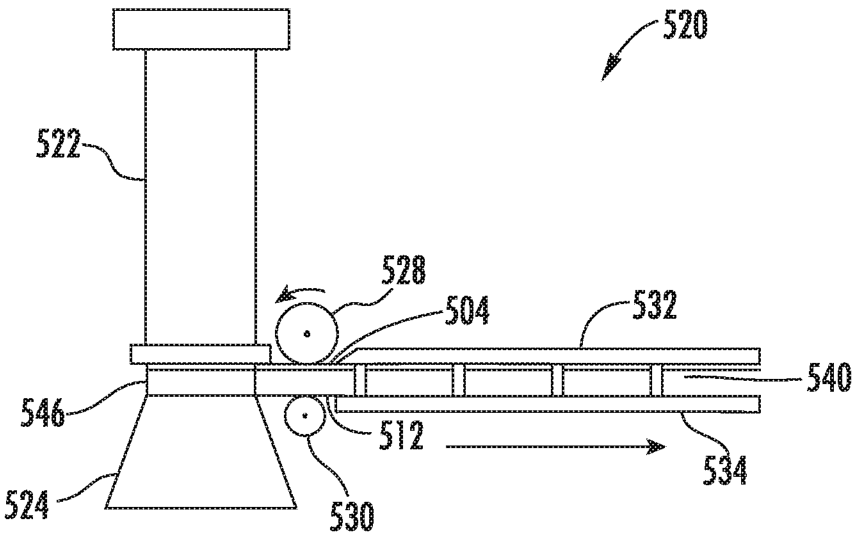
FIG. 17 represents additional details of the plunge cut and seal thermal bonding station of FIG. 19.
Figure 18:
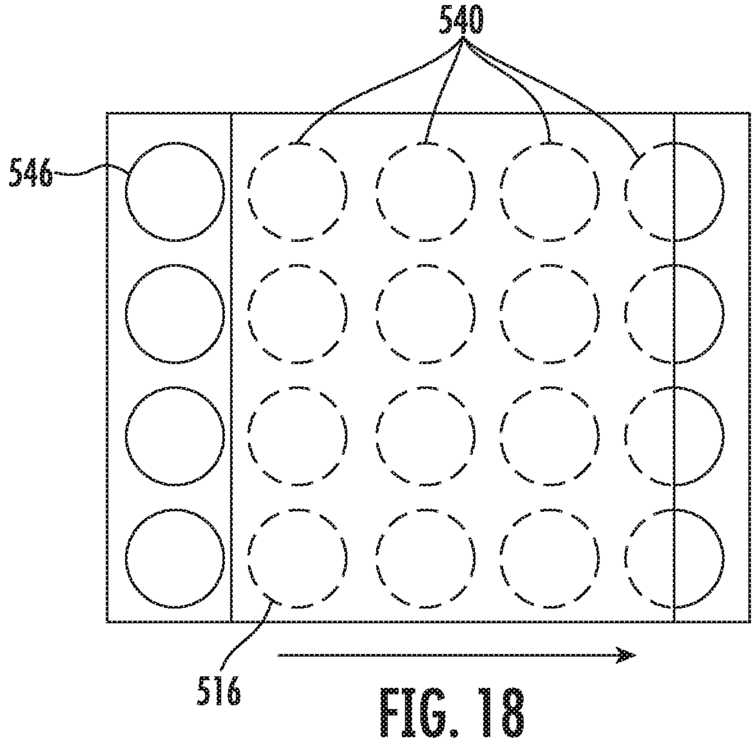
FIG. 18 represents the combined base and intermediate layer web.

FIG. 17 shows additional details of the plunge cut and seal thermal bonding station 520, the pad guide plate 532 above and the support plate 534 below. FIG. 18 represents the combined base and intermediate layer web 516, indicating locations of representative pad precursors. (The handle is added later.) In FIG. 18, representative pad precursors or representative pad precursor locations are designated 540. Representative pad precursors at the plunge cut and seal thermal bonding station 520 are designated 546.

Referring again to FIG. 15, following the plunge cut and seal thermal bonding station 520 and the plates 532 and 534 is a thermal bonding station 550. The thermal bonding station 550 includes an entry pair 552 of rollers, which bring the web 508 of handle-forming material into contact with the combined base and intermediate layer web 525 for thermal bonding.

Following the thermal bonding station is a die cutting station 560, which is like the die cutting station 220 of FIG. 1. By way of example, the die cutting station 560 includes rotary die cutting tooling which cuts through all three layers of material, creating and freeing multilayer pads, while leaving a recyclable scrap web 562. Finished pads are collected and packaged, for example by vacuum roll collection and stacking machinery 564 (which also packages). The scrap web 562, which includes remnants of all three layers, with multiple apertures where pads have been cut out, is collected by a scrap rewind roll 566.

Figure 19:
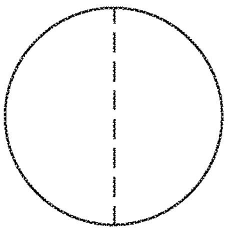
FIG. 19 represents a thermally cut pad having a "wings" handle.
Figure 20:
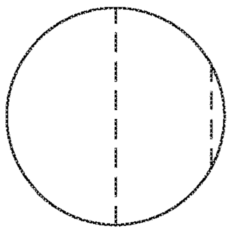
FIG. 20 represents a thermally cut pad having an "L"-shaped handle.

FIG. 19 then represents a thermally cut pad having a "wings" handle; and FIG. 20 represents a thermally cut pad having an "L"-shaped handle.

While specific embodiments of the inventionhave been illustrated and described herein, it is realized that numerous modifications and changes wil occur to those skilled in the art. It is therefore to be understood that the appended claims are intended to cover all such modifications and changes as fall within the true spirit and scope of the invention.

What is claimed is:

1. An in-line method for manufacturing a plurality of multilayer pads, comprising the steps of:
- providing a web of fusible base-pad-forming material;
- providing a web of fusible intermediate barrier-layer-forming material;
- providing a web of fusible handle-forming material;
- at a first bonding station, fusing a portion of the base-pad-forming material to the barrier-layer-forming material to form a base layer and intermediate layer precursor;
- at a second bonding station, fusing the handle-forming material to the base layer and intermediate layer precursor, while leaving at least one portion of the handle-forming material free with reference to a pad to be formed to form an uncut pad precursor web; and
- cutting through the pad precursor web to form a multilayer pad.

2. The method of claim 1, wherein:
- said step of providing a web of fusible base-pad-forming material includes providing a web of fusible base-pad-forming material having a longitudinal axis; wherein
- at the first bonding station at least a pad attachment bond line is formed parallel to the longitudinal axis and near a lateral edge of a pad precursor; and wherein
- at the second bonding station at least a handle attachment bond line is formed parallel to the longitudinal axis and near the middle of the pad precursor.

3. The method of claim 2, wherein at the second bonding station only the lateral middle of the handle-forming material web is bonded to the precursor;
- whereby pads with "wings" handles are formed.

4. The method of claim 2, wherein at the second bonding station the lateral middle of the handle-forming material web and a portion of the handle-forming material web near the other lateral edge are bonded to the precursor;
- whereby pads with "L"-shaped handles are formed.

5. The method of claim 1, comprising a "make up" procedure, wherein, following the first bonding station, the base layer and intermediate layer precursor is stored.

6. The method of claim 1, comprising a "make up" procedure, wherein, following the second bonding station, the uncut pad precursor web is stored.

7. The method of claim 1, wherein said step of cutting comprises plunge cutting.

8. An in-line method for manufacturing a plurality of multilayer pads, comprising the steps of:
- providing a bottom fusible web, the bottom fusible web being either co-extruded barrier-layer material and base-pad material, or barrier-layer material coated over base-pad material;
- providing a web of fusible handle-forming material;
- at a bonding station, fusing the handle-forming material to the bottom fusible web, while leaving at least one portion of the handle-forming material free with reference to a pad to be formed to form an uncut pad precursor web; and
- cutting through the pad precursor web to form a multilayer pad.

9. The method of claim 8, wherein said step of providing a bottom fusible web includes providing a bottom fusible web having a longitudinal axis;

wherein at the bonding station, at least a bond line is formed parallel to the longitudinal axis and near the middle of the pad precursor.

10. The method of claim 9, wherein at the bonding station only the lateral middle of the handle-forming material web is bonded to the bottom fusible web;

whereby pads with "wings" handles are formed.

11. The method of claim 9, wherein at the bonding station the lateral middle of the handle-forming material web and a portion of the handle-forming material web near the other lateral edge are bonded to the bottom fusible web;

whereby pads with "L"-shaped handles are formed.

12. The method of claim 8, wherein said step of cutting comprises plunge cutting.

13. A multilayer pad comprising:

an absorbent base pad layer having an applying wiping surface, an attachment surface opposite said applying wiping surface, and an outer periphery;

a barrier layer having a lower surface attached by fusing to said base pad layer attachment surface, having an upper surface and having an outer periphery coextensive with said outer periphery of said base pad layer;

a handle including an attached portion fused to a portion of said barrier layer upper surface, and including at least one graspable free portion joined to said handle attached portion and having an outer periphery coextensive with said outer periphery of said base pad and handle layers; and said handle attached portion being attached to said barrier layer upper surface along at least one bond line parallel to the pad axis.

14. The multilayer pad of claim 13, wherein:

said graspable free portion joined to said handle attached portion along a fold line defining an axis of said multilayer pad; and wherein said handle attached portion is attached to said barrier layer upper surface at least by a bond line adjacent the fold line.

15. The multilayer pad of claim 13, wherein said barrier layer lower surface is attached to said base pad layer attachment surface at least by a bond line which does not attach said handle attached portion.

16. The multilayer pad of claim 13, wherein the same bond lines which attach said handle attached portions to said barrier layer upper surface attach said barrier layer lower surface to said base pad layer attachment.

17. The multilayer pad of claim 13, which has an "L"-shaped handle.

18. The multilayer pad of claim 13, wherein said handle comprises "wings".

19. The multilayer pad of claim 13, wherein said barrier layer is continuously fused to said base pad layer.

* * * * *